US009805702B1

(12) United States Patent
Lane et al.

(10) Patent No.: US 9,805,702 B1
(45) Date of Patent: Oct. 31, 2017

(54) SEPARATE ISOLATED AND RESONANCE SAMPLES FOR A VIRTUAL INSTRUMENT

(71) Applicant: Apple Inc., Cupertino, CA (US)

(72) Inventors: Christopher C. Lane, Berkeley, CA (US); Hage van Dijk, Santa Clara, CA (US); Andrew Barrett, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/273,909

(22) Filed: Sep. 23, 2016

Related U.S. Application Data

(60) Provisional application No. 62/337,326, filed on May 16, 2016.

(51) Int. Cl.
G10H 1/08 (2006.01)
G10H 1/18 (2006.01)

(52) U.S. Cl.
CPC ............... G10H 1/08 (2013.01); G10H 1/18 (2013.01); G10H 2210/271 (2013.01); G10H 2210/325 (2013.01); G10H 2240/161 (2013.01)

(58) Field of Classification Search
CPC ....... G10H 2240/145; G10H 2210/066; G10H 2240/165; G10H 2240/241; G10H 2240/131; G10H 2250/641; G10H 1/0033; G10H 2210/031; G10H 2240/125; G10H 2240/135; G10H 2250/635; G10K 15/04
See application file for complete search history.

(56) References Cited

U.S. PATENT DOCUMENTS

| 5,440,071 | A | 8/1995 | Johnson |
| 5,852,252 | A | 12/1998 | Takano |
| 5,890,116 | A | 3/1999 | Itoh et al. |
| 5,905,223 | A | 5/1999 | Goldstein |
| 6,111,179 | A | 8/2000 | Miller |
| 6,188,008 | B1 | 2/2001 | Fukata |
| 6,898,729 | B2 | 5/2005 | Virolainen et al. |
| 6,915,488 | B2 | 7/2005 | Omori et al. |
| 7,119,268 | B2 | 10/2006 | Futamase et al. |

(Continued)

FOREIGN PATENT DOCUMENTS

| EP | 2 045 796 A1 | 8/2009 |
| EP | 2 166 438 A1 | 3/2010 |

OTHER PUBLICATIONS

International Preliminary Report on Patentability for Application No. PCT/US2013/029466, dated Sep. 18, 2014. 17 pages.

(Continued)

Primary Examiner — Marlon Fletcher
(74) Attorney, Agent, or Firm — Kilpatrick Townsend & Stockton LLP

(57) ABSTRACT

A virtual instrument can manage separate static and dynamic samples for various notes that can be played by the virtual instrument. In some cases, the static samples correspond to resonance sounds recorded for an instrument and are the same for every note. However, the dynamic samples may correspond to isolated sounds that are recorded for each variation of a note that can be played. In response to a user's selection of a note on a user interface of the virtual instrument, the virtual instrument may determine a rule for layering the various static and dynamic samples for playback.

20 Claims, 10 Drawing Sheets

(56) References Cited

U.S. PATENT DOCUMENTS

| | | |
|---|---|---|
| 7,273,979 B2 | 9/2007 | Christensen |
| 7,754,955 B2 | 7/2010 | Egan |
| 7,985,917 B2 | 7/2011 | Morris et al. |
| 8,378,200 B1* | 2/2013 | Beigel ................. G10H 1/0025 |
| | | 84/610 |
| 8,426,716 B2 | 4/2013 | Little et al. |
| 8,751,971 B2 | 6/2014 | Fleizach |
| 2002/0144587 A1 | 10/2002 | Naples et al. |
| 2003/0188627 A1* | 10/2003 | Longo ................. G10H 1/0066 |
| | | 84/627 |
| 2004/0154460 A1 | 8/2004 | Virolainen et al. |
| 2004/0159219 A1 | 8/2004 | Holm et al. |
| 2006/0165240 A1* | 7/2006 | Bloom ................. G10H 1/366 |
| | | 381/56 |
| 2007/0240559 A1 | 10/2007 | Hasebe |
| 2008/0307945 A1 | 12/2008 | Gatzsche et al. |
| 2009/0102817 A1 | 4/2009 | Bathiche et al. |
| 2010/0287471 A1 | 11/2010 | Nam et al. |
| 2011/0000359 A1* | 1/2011 | Yoshida ............... G10H 1/0008 |
| | | 84/601 |
| 2011/0100198 A1 | 5/2011 | Gatzsche et al. |
| 2011/0146477 A1 | 6/2011 | Tsukamoto |
| 2011/0191674 A1 | 8/2011 | Rawley et al. |
| 2011/0234503 A1 | 9/2011 | Fitzmaurice et al. |
| 2011/0316793 A1 | 12/2011 | Fushiki |
| 2012/0160079 A1 | 6/2012 | Little et al. |
| 2012/0174735 A1 | 7/2012 | Little et al. |
| 2012/0174736 A1 | 7/2012 | Wang et al. |
| 2012/0247306 A1* | 10/2012 | Shimizu ................. G10H 5/007 |
| | | 84/616 |
| 2013/0283159 A1 | 10/2013 | Nam et al. |

OTHER PUBLICATIONS

"Direct Note Access," product information Celemony Software GmbH (2012). 2 pages.
International Search Report and Written Opinion for International Patent Application No. PCT/US2013/029466, dated Nov. 7, 2013. 23 pages.
Partial Search Report for International Patent Application No. PCT/US2013/029466, dated Aug. 7, 2013. 8 pages.
Little, A. "Pipa Touch Instrument Specification." Mahjong, Part of Stratego, v1.1. Mar. 3, 2016. 9 pages.
Little, A. "Erhu Touch Instrument Specification." Mahjong, Part of Stratego, v1.2. Feb. 15, 2016. 11 pages.
Little, A. "Erhu Specification." Mahjong, Part of Stratego, v1.1. Feb. 10, 2016. 11 pages.

* cited by examiner

SEPARATE ISOLATED AND RESONANCE SAMPLES FOR A VIRTUAL INSTRUMENT

CROSS-REFERENCE TO RELATED APPLICATIONS

The present disclosure is a non-provisional of and claims the benefit and priority under 35 U.S.C. 119(e) of U.S. Provisional Application No. 62/337,326 filed May 16, 2016 entitled "CHINESE VIRTUAL INSTRUMENTS INCLUDING UI FOR ADJUSTING TRILL AND LUNZHI," the entire contents of which is incorporated by reference herein in its entirety.

This application is also related to U.S. Pat. No. 8,937,237 filed Mar. 6, 2013 entitled "DETERMINING THE CHARACTERISTIC OF A PLAYED NOTE ON A VIRTUAL INSTRUMENT," which is herein incorporated by reference in its entirety.

BACKGROUND

Virtual musical instruments, such as musical instrument digital interface (MIDI)-based or software-based keyboards, guitars, bass instruments, and the like, typically have user interfaces that attempt to closely resemble the actual instrument. When a user selects an element of the user interface, the virtual musical instrument attempts to play a note, combination of notes, chord(s), etc., to simulate playing the actual instrument. While these instruments are enjoyable to amateur and experienced musicians alike, they may not be satisfactory to audiophiles. For example, the sounds that are played by the virtual instruments may not sound authentic and/or may sound electronic. When the virtual instrument is attempting to simulate a non-electronic instrument, this can be problematic, even to those with less keen ears for such sounds. Additionally, in order to attempt to play every possible combination of playable notes that a user may select through the user interface, the software for implementing the virtual musical instrument can be very large. While this may not be a problem for some computers, such software may be too large for smaller devices, such as mobile phones or the like.

SUMMARY

Embodiments of the present disclosure can provide systems, methods, and computer-readable medium for implementing separate isolated and resonance acoustic systems for a virtual string instrument. In some examples, a computing device (e.g., a mobile phone or other portable, handheld device) may store digital audio content (e.g., MIDI or other audio files) that may be played in response to user selection of a user interface (UI) element. The amount of storage needed to store the audio content may be significantly smaller than traditional systems due, at least in part, to the features and techniques described herein. Additionally, the audio content may sound more realistic than audio content played by traditional virtual instruments.

In some examples, a computer-implemented method for implementing separate isolated and resonance acoustic systems for a virtual string instrument may be provided. The method may include receiving an isolated audio sample corresponding to a first recording of each respective isolated sound that corresponds to each variation of each musical note of a plurality of musical notes playable by an instrument. In some cases, the method may include receiving a resonance audio sample corresponding to a second recording of a resonance sound that is associated with the instrument for each musical note of the plurality of musical notes. The method may also include storing each respective isolated audio sample and each resonance audio sample. In some cases, the method may also include identifying a note to be played that corresponds to at least one of the plurality of musical notes playable by the instrument based at least in part on the received input. The method may also include identifying, based at least in part on the received input, a manner in which the note is to be played that corresponds to a variation of the note based at least in part on the received input. Additionally, the method may include determining, based at least in part on the identified manner in which the note is to be played, a rule for layering the isolated audio sample corresponding to the identified note and the resonance audio sample corresponding to the identified manner. In some cases, the method may also include retrieving the isolated audio sample corresponding to the identified note and the resonance audio sample corresponding to the identified manner based at least in part on the determined rule and/or playing by outputting the isolated audio sample and the resonance audio sample according to the determined rule.

In some examples, the variation may comprise a different pitch, a different loudness, a different plucking sound, or a different string sound of each musical note. Additionally, the resonance sound may comprise ambient noise produced by the instrument when each musical note is played. In some cases, a first size of memory adequate to store each respective isolated audio sample and each resonance audio sample may be smaller than a second size of memory adequate to store a set of recordings that comprise all variations of the plurality of musical notes playable by the instrument. Further, the manner in which the note is to be played may be identified by an input technique corresponding to at least one of a sustain technique, an attack technique, a release technique, a strum technique, a pick technique, or a bow draw technique.

In some examples, a computer-readable medium may be provided. The computer-readable medium may include instructions, that when executed, configure a processor to perform operations including receiving a plurality of isolated audio samples corresponding to recordings of variations of musical notes played by a first instrument and a plurality of resonance audio samples corresponding to recordings of ambient noise recorded when the musical notes are played by the first instrument. The operations may also include receiving a first input at a user interface of a second instrument, the first input identifying a note to be played by a virtual instrument associated with the first instrument. The operations may also include playing, by outputting, at least one of the isolate audio samples and at least one of the resonance audio samples based at least in part on a first manner in which the first input is made, the first manner corresponding to a first variation of the variations of musical notes. In some cases, the operations may also include receiving a second input at the user interface of the second instrument, the second input identifying the note to be played by the virtual instrument. Further, the operations may also include playing, by outputting, the at least one of the isolated audio samples based at least in part on a second manner in which the second input is made, the second manner corresponding to a second variation of the variations of musical notes and/or determining whether to play any of the resonance audio samples based at least in part on whether a rule corresponding to the second manner is met.

In some cases, the plurality of isolated audio samples may be recorded at a different time than the plurality of resonance audio samples. Additionally, a single resonance audio samples of the plurality of resonance audio samples may be recorded for a set of musical notes that comprises each of the variations of musical notes. In some cases, the rule may instruct the processor to play by outputting the at least one of the resonance audio samples if a first pitch of the note corresponding to the first input and a second pitch of the note corresponding to the second input are a same pitch and if a slide request or a noodling request are received at the user interface.

In some examples, a device configured to implement separate isolated and resonance acoustic systems for a virtual string instrument may be provided. The device may include a touch screen configured to receive touch input, a memory configured to store computer-executable instructions, a speaker, and a processor in communication with the memory, the touch screen, and the speaker. In some instances, the processor may be configured to execute the instructions to at least receive a plurality of isolated audio samples corresponding to recordings of variations of musical notes played by a first instrument and a plurality of resonance audio samples corresponding to recordings of the musical notes played by the first instrument. The processor may also store the plurality of isolated audio samples and the plurality of resonance audio samples in the memory. The processor may also receive an input at a user interface of a second instrument associated with the first instrument, the input identifying a note to be played by second instrument. The processor may also determine a rule for playing at least one of the isolated audio samples and at least one of the resonance audio samples based at least in part on the identified note to be played and a manner in which the note is to be played, the manner corresponding to at least one variation of the variations. Further, the process may play, by outputting on the speaker, the at least one isolated audio sample and the at least one resonance audio sample according to the determined rule.

In some examples, the processor may also be configured to receive a pitchbend request for the note being played, bend a pitch of the isolated audio sample based at least in part on the pitchbend request, and maintain an original pitch of the at least one resonance audio sample being played. Alternatively, the processor may be configured to receive a pitchbend request for the note being played, play a bent pitch associated with the isolated audio sample based at least in part on the pitchbend request, and play or replay an original pitch of the resonance audio sample. Additionally, the plurality of resonance audio samples may exclude respective isolated audio samples. In some examples, the second instrument may comprise a virtual instrument configured to simulate the first instrument and/or the request to play the note of the virtual instrument may be received at the user interface of a user device. Additionally, in some cases, the rule may configure the at least one resonance audio sample to be played for a time longer than the at least one isolated audio sample. The rule for playing the at least one isolated audio sample and the at least one resonance audio sample may be further based at least in part on a set of conditions and/or the set of conditions are configured to evaluate the variation of the note to be played based at least in part on the identified manner. Further, the isolated audio samples may be recorded in a monophonic (mono) format and/or the resonance sounds are recorded in a stereophonic (stereo) format. In some instances, a large collection of isolated samples may be recorded in mono, while a much smaller collection of resonance samples may be recorded in stereo. Thus, the playback of the layered samples provides a realistic sound without requiring a large number of stereo samples to be stored. As discussed below, this drastically reduces the size of the system and, thus, the amount of memory required to store the samples.

The following detailed description together with the accompanying drawings will provide a better understanding of the nature and advantages of the present disclosure.

DETAILED DESCRIPTION

Figure 1:
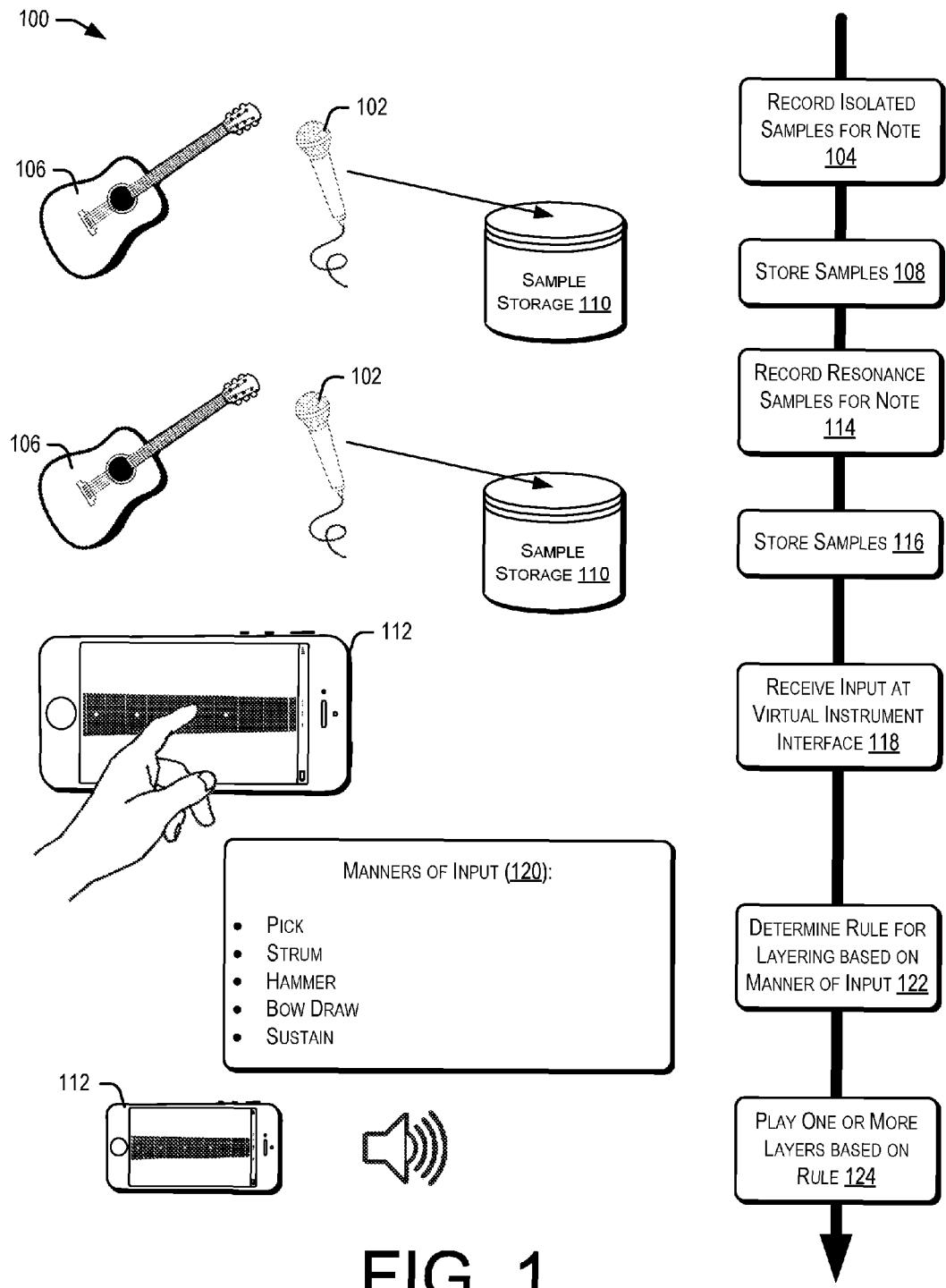
FIG. 1 is a simplified block diagram illustrating at least some example techniques for implementing separate isolated and resonance samples for a virtual instrument as described herein, according to at least one example.

Certain embodiments of the present disclosure relate to devices, computer-readable medium, user interfaces, and methods for implementing separate isolated and resonance acoustic systems for virtual instruments. Examples are described with reference to virtual instruments, and user interfaces of the virtual instruments for playing notes and/or music (e.g., electronic audio files) with the virtual instruments. The virtual instruments are generally designed to give the look and feel of an actual instrument, and are intended to sound like the actual instrument. Virtual instruments can be designed to mimic nearly any musical instrument, with examples including, but not limited to, string instruments, horns, various keyboards, and the like. In some examples, a recording device (e.g., a microphone or other audio input device) can be configured to record samples of the actual instrument. Various notes, chords, playing techniques, etc., can be recorded and stored. These stored sounds can then be associated, in memory, with various inputs and/or input types (e.g., detected input techniques) of the virtual instruments. The inputs and/or input types can be received via a UI that represents the actual instrument (e.g., the UI for a guitar may be designed to look like a guitar). Thus, when a user moves his finger across a virtual string displayed on the UI, the virtual instrument can play the sound that was recorded when the corresponding string of an actual guitar was strummed. In some examples, in order to provide for every possible note, chord, and/or playing technique (e.g., for a guitar, playing techniques may include strumming, striking, plucking, picking, etc.), each of those sounds must be recorded (e.g., sampled), stored, and associated with the appropriate UI inputs. Then, upon receipt of a request to play a note or sound, the computing system will need to look up the corresponding samples associated with the input, and play the sample. Many different samples must be stored and, in order to make the playback sound realistic, these samples are often recorded in stereo.

Additionally, each note may have an isolated element and a resonant element. For example, when a person strums a string of a guitar, the string makes a sound, and the guitar itself makes a sound. Both of these sounds are part of the aggregate sound that makes up the sample, and that a user hears when the sample is played. The isolated sound may be the note itself, and may be a different sound for different guitars, or other instruments, but if played correctly, it should always be recognizable as the note that was played. On the other hand, the resonant sound is the sound that occurs as the result of the instrument body vibrating and/or by other strings (or instrument parts) being caused to move, even if only slightly. For a guitar, some of the resonant sound is caused by the hollow body of the instrument, and the fact that the string vibrates to play the note. A resonant sound for one instrument may be completely different from that of another instrument playing the same note. The differences may be based on the type of material (e.g., wood) that the instrument is made of, how old the instrument is, how well used (e.g., was it well cared for, is it dirty?) or tuned the instrument is, etc. As such, it may be desirable to record these two elements separately, and play them as separate layers, using various techniques and/or rules, when a user selects a particular UI element of the virtual instrument.

By recording the two elements separately, the total size of the software needed to implement such a system may be significantly reduced. For smaller devices (e.g., mobile phones, etc.) with less memory than their larger counterparts, this can be very important. Additionally, by separating the two elements of a note, the layered sounds that can be played can sound more realistic than similar sounds from systems that have a single layer. In this way, the techniques described herein provide multiple technological advancements (e.g., reduced software size and enhanced audio playback quality). The reduced size enables the software to be loaded onto smaller devices with less memory capacity. As operating systems and other software applications grow in memory size, it is desirable to reduce the size of as many other applications as possible. The enhanced audio playback quality adds to the ability for a sample-based, virtual instrument to sound more like a real instrument being played.

Additionally, in some examples, it may be beneficial to track the MIDI pitchbend data of the primary sounding note to calculate both a pitch and volume offset for sympathetic resonance recordings that is different from the native MIDI note triggering the resonance. For example, in an acoustic stringed instrument, playing a note with a specific frequency will cause sympathetic resonances to vibrate on the other non-played strings. This sympathetic vibration varies based on the audio frequency of the primary note. The sympathetic notes and overtones can be fixed along natural nodes of the harmonic series of the string. Alterations of the pitch of the primary note, however, may not alter the pitch of the sympathetic notes, but instead may alter the strength of resonance and which nodes are activated sympathetically.

However, in some cases, in a MIDI-based virtual instrument, notes may be played with fixed associated musical pitches that are sometimes further modified by a second pitchbend message. The primary note and the pitchbend message combine to generate the desired output note. The sympathetic notes, however, may not trigger based on the original unmodified pitch, as the added pitchbend value could result in a perceived pitch quite far from the original note value. Nor should the sympathetic note be triggered based on the original note and then modified to also be pitch bent to match the primary triggering note, as sympathetic notes do not naturally change pitch in this way. The desired output is that the correct sympathetic note is triggered based on the combined information of the primary note's original pitch and the added pitchbend offset, and that the strength of this sympathetic note is scaled based on how close to a natural note that combined pitch is.

Therefore, in some examples, specific sympathetic resonance samples in a stringed virtual instrument may be performed according to the following methodology:

1) The pitch of the sympathetic note chosen can be calculated based on what the MIDI note would be when combining the triggering note's native pitch with the pitchbend amount, and rounding to the nearest full note.

2) The strength (volume) of the sympathetic note can be scaled based on the distance a triggering note+pitchbend offset is to a 'true' note (e.g., how 'in tune' the note is). The initial volume of the sympathetic note is reduced as the triggering note approaches the most out-of-tune position between two notes. The initial volume of the sympathetic note then increases as a triggering note approaches a more in-tune position of a note.

Here are three examples using these two rules:
An incoming MID I note of C4 with a pitchbend offset of +50 cents would trigger the C4 resonance note with a minimum loudness.
An incoming MID I note of C4 with a pitchbend offset of +75 cents would trigger the C#4 resonance with approximately half its loudness.
An incoming MIDI note of C4 with a pitchbend offset of +100 cents would trigger the C#4 resonance with full loudness.

These rules establish a realistic relationship between virtual instrument samples, pitchbend, and natural acoustic resonance that is not typically available in virtual instrument design, and is a unique benefit of separating out primary and resonance layers combined with our specific implementation of MIDI pitchbend tracking.

FIG. 1 illustrates an example flow 100 for implementing separate isolated and resonance samples for a virtual instrument as described herein. In some examples, recording device 102 (e.g., a computing system with a microphone or the like) may be configured to record an isolated sample at 104. The isolated sample may be a recording of sound that is made when a string of instrument 106 (e.g., a guitar) is affected in some way. For example, a user may strum, pluck, hammer, pull, draw with a bow, fingernail, or other item, etc., instrument 106 to make the sound. Recording device 102 may be configured to record just the isolated sound made by the string. In some examples, a special recording device can be used to isolate the note that was played by the string. For example, a specific type of microphone can be placed in a specific position on instrument 106. For different instruments, different special microphones might need to be designed and/or utilized to record just the isolated sound. In one instance, a microphone may be taped to the neck of the guitar, right next to the string in such a way that it can record only the sound that comes from the string, and not any other sounds. For a stringed instrument, the other strings may be manually muted during recording. In other examples, a microphone may be part of the pick that is used to effect the string and/or may be placed within an encapsulation of the string itself (e.g., surrounding the string without touching it).

Once the isolated note is sampled at 104, the sample may be stored at 108 in sample storage 110. Sample storage 108 can be any type of memory or storage device including, but not limited to, any type of non-volatile memory that can be used to store the isolated samples in a permanent or at least semi-permanent fashion. Sample storage 108 can be memory that is local to recording device 102, the computing system that includes recording device 102, or user device 112 (e.g., a cellular telephone, tablet, laptop, or the like). As such, the samples may be stored at user device 112 as soon as they are created, or they may be need to be received by user device 112 and stored locally for later use. In any event, the isolated samples can be stored for replay when a user selects an appropriate UI element, as will be described in further detail. In some instances, individual isolated samples may be recorded for every variation of every possible note that can be played by instrument 106. In other words, for the note A, a sample can be recorded and stored for a strum, a pluck, an attack, a sharp, a flat, etc. Each of these variations can be unique for the isolated element.

At 114, a resonance sample can be recorded for each. Again, recording device 102 (or any recording device) can be used to record a resonant (ambient) sound that is produced when each note is played by instrument 106. For each note, regardless of the variation or playing technique, a single resonant recording can be collected at 114. Additionally, similar to with the isolated notes, the resonant notes can be stored in sample storage 110 (or another memory) at 116. In some examples, the resonant samples may be recorded using a different microphone or type of recording device from recording device 102. For example, nearly any microphone placed near instrument 106 should pick up the resonant sound. However, an optimal way to the collect the resonant sound would be a microphone attached or very close to the strings of instrument 106. However, the resonant samples do not need to be unique for each variation of the notes played. In particular, a single resonant sample can be recorded for every variation of a single note. For example, for the note A, a resonant sample can be recorded that will work for strum, pluck, hammer, bow draw, sustain, etc. However, there may be a different resonant sample for A sharp or A flat. In some cases, the ability to reuse the resonant samples for different variations of a note enables the size of the software needed to implement the described features to be smaller than other sample-based virtual instrument systems.

In some examples, a user may activate and/or utilize a UI of user device 112 to play the virtual instrument. In one example, a guitar neck may be presented by the UI in such a way as to represent the frets of the neck of instrument 106. As such, at 118, user device 112 may receive an input at the UI of the virtual instrument application presented by user device 112. The input may be an indication of two different things: the note that the user would like to play (e.g., identified based on a location of the input at the UI) and the manner with which the user would like the note played (e.g., identified based on one or more of many different manners 120). For example, manners of input 120 may include, but are not limited to, a pick input, a strum input, a hammer input, a bow draw input, a sustain input (e.g., where the user holds their finger on the string for an extended period of time), or the like. In some examples, the inputs will be received at the UI of the virtual instrument application (e.g., via a user of the virtual instrument interacting with a touch screen of user device 112. These manners of input 120 can be predefined and even detailed to the user (e.g., in an instruction manual) so that the user knows what manners of input 120 are available and how to play the virtual instrument. In some examples, a rule for layering the samples may be determined at 122. Layering the samples may include playing both the isolated and resonant samples at the same time and/or during overlapping times. In some cases, the rules can define how the overlap is to be performed and/or for how long. In some examples, the rules may be applied differently based on how the manner of input 120 is performed and based on which note was selected. As such, the appropriate rule will need to be determined at 122 at least after the input is received at 118. In some instances, user device 112 can then play one or more of the samples and/or layers of samples at 124 based at least in part on the rule determined at 122. The audio samples (layered or individually) can be played by a speaker or other output device of user device 112.

Figure 2:
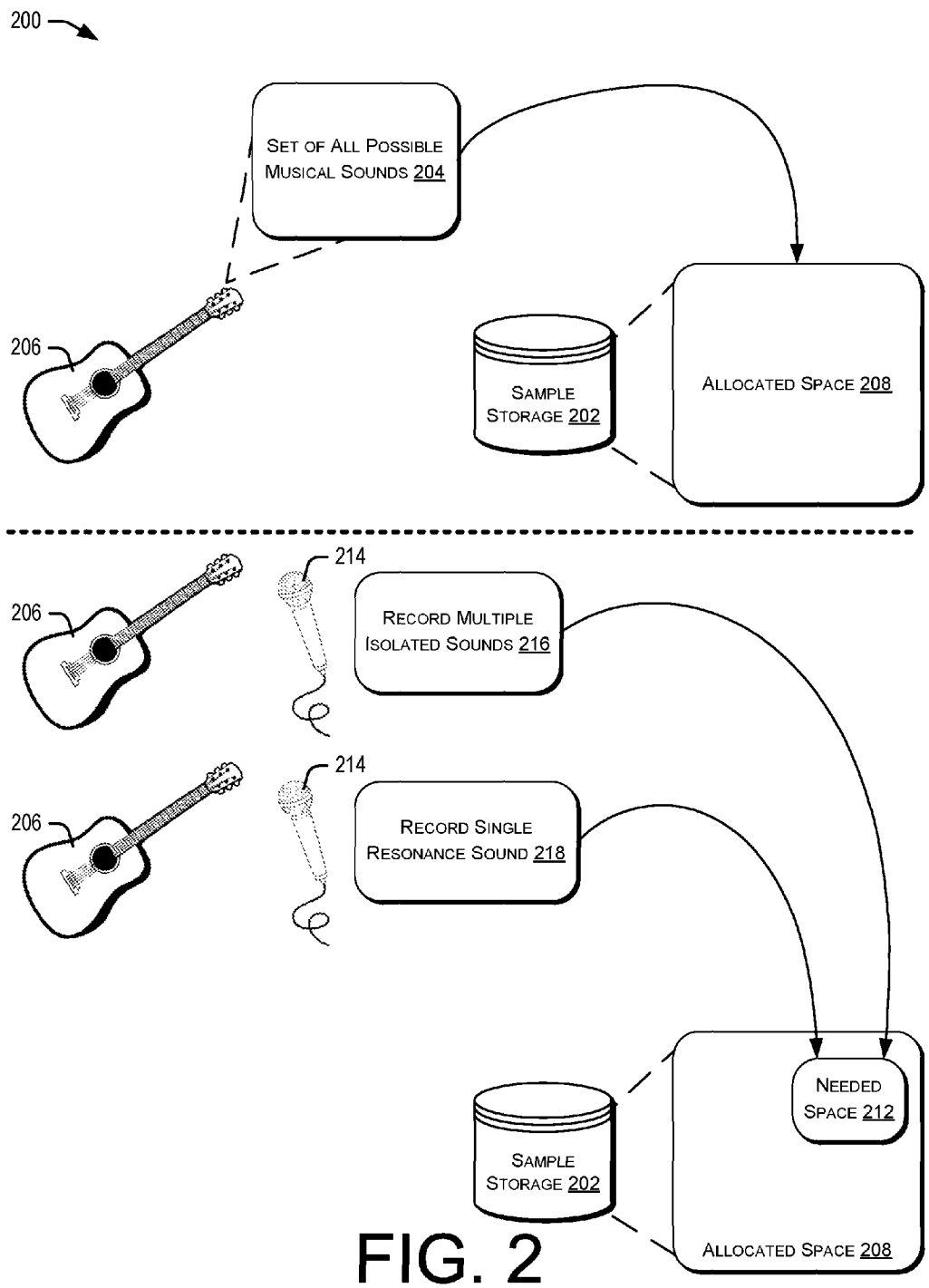
FIG. 2 is another simplified block diagram illustrating at least some additional examples techniques for implementing separate isolated and resonance samples for a virtual instrument as described herein, according to at least one example.

FIG. 2 shows an example architecture 200 for illustrating how separate isolated and resonance acoustic samples for a virtual instrument can be used to reduce the total size or amount of storage space required to implement a virtual instrument. In some examples, sample storage 202 can be any type of memory configured to store any data. Sample, as used throughout this disclosure, refers to an audio sample, or other sound recording. However, sample storage 202 (as well as sample storage 110 of FIG. 1) can store any kind of data. In some instances, a set of all possible musical sounds 204 can be recorded from instrument 206 or otherwise received from a recording device that has recorded all of the possible musical sounds 204. Additionally, in some cases, there may be a particular amount of allocated space 208 of sample storage 202 that is reserved or otherwise required to store the set of all possible musical sounds 204. The set of all possible musical sounds 204 may include a separate recording for every variation of every note that can be played by instrument 206. As such, the allocated space 208 may be very large or even all of sample storage 202.

However, using the techniques described herein, the amount of space needed (needed space) 210 may be much smaller than allocated space 208. For example, instead of the set of all possible musical sounds 204, if recording device 214 only recorded multiple isolated sounds 216 and a single resonance sound 218 for each note, that could all be stored in needed space 212. As shown in FIG. 2, needed space 202 takes much less than all of allocated space 208. In some instances, the set of all possible musical sounds 204 may fill the entire allocated space 208. However, the combination of the multiple isolated sounds 26 and the single resonance sound 218 may only fill the needed space 212, which can be ½, ¼, ¹⁄₁₀, or even smaller of the allocated space 208.

The storage space savings can be illustrated through the following non-limiting example. On guitar, for example, a user might play a very short note. In a typical sampled instrument, there would be two options to recreate this: 1) Record a long note and end the recording prematurely (this would sound unrealistic), or 2) Make additional recordings of "short notes" that would play as a special case. Even though they are "short," they may still need to be long recordings because they may have to capture the entire resonance after the main short note ends. However, by breaking up the isolated samples from the resonance samples (and recording the resonance samples in stereo while the isolated samples are in mono), a single long isolated note can be used to playback both very short and very long notes, because the resonance sample will play at full length to provide realism. In some cases, the space savings comes from not having to record the special short notes.

In another example, to play one really long note and one short note, a typical library might include A) one long stereo file of long note and B) one long stereo file of short note (e.g., "long" because it must also capture post-note resonance). The total memory required for this would need to able to store four channels of audio (e.g., two stereo files). However, by splitting up the sounds and layering appropriately as described herein, the library could instead include A) one long mono file of isolated note and B) one long stereo file of resonance note. Here, the total memory required would need to be able to store three channels of audio (e.g., one mono file and one stereo file). Thus, a savings of roughly 25% memory can be realized. Additionally, considering that there could be three recordings for levels of "note intensity" for each length note (e.g., a soft note, a normal note, and a loud/hard note), the savings could be even more. For example, a typical library may need A) three long stereo files of long note and B) three long stereo files of short note (e.g., "long" because it must also capture post-note resonance), for a total memory requirement of twelve channels of audio (e.g., six stereo files). However, using the techniques described herein, the system would only need A) three long mono files of isolated note (e.g., soft, normal, hard) and B) one long stereo file of resonance note, for a total memory requirement capable of storing five channels of audio (e.g., three mono files and one stereo file). For the examples above, it should be understood that a stereo file is two channels of audio while a mono file is only one channel.

Figure 3:
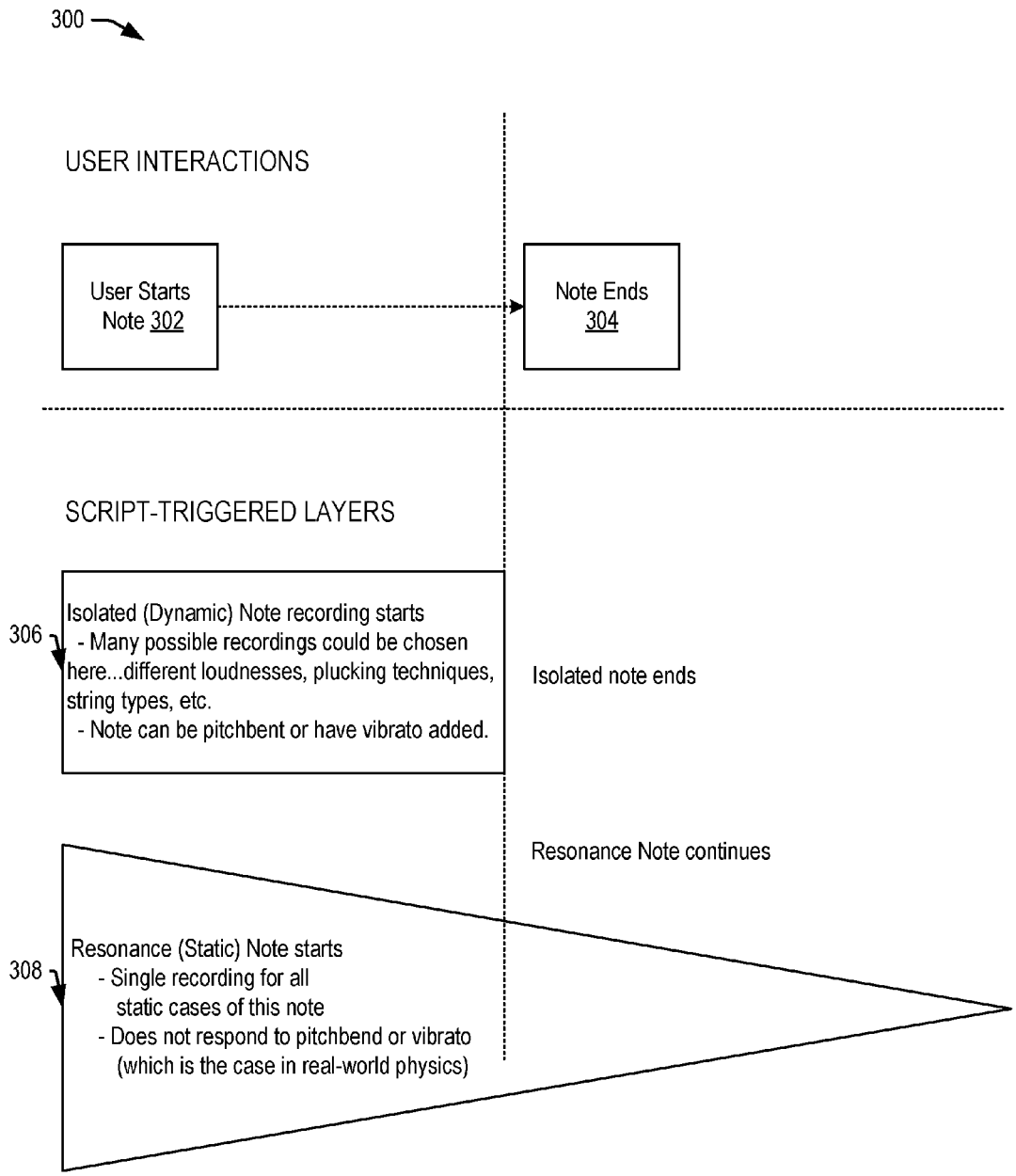
FIG. 3 is another simplified block diagram illustrating at least some additional examples techniques for implementing separate isolated and resonance samples for a virtual instrument as described herein, according to at least one example.

FIG. 3 shows an example flow diagram 300 for illustrating at least one rule that can be followed for playing the different samples based on a user input at a UI of the virtual instrument described herein. As noted, in some examples, the manner in which a user provides an input to the UI may be used to determine which playback rule applies. Thus, FIG. 3 illustrates at least one of these rules. The top half of the flow illustrates user interactions while the lower half of the flow illustrates the script-triggered layers. The layers may be script-triggered in that they are determined at runtime based at least in part on events. The events, in this case, are the user inputs received at the UI of the virtual instrument application. By configuring the layers to be script-triggered, a scripting language can be used to interpret the script language code while the application is running. When an event is identified, the script language code can be interpreted, and appropriate rules can be implemented automatically.

As time moves from left to right in FIG. 3, in some cases, a user may provide an input to the UI that indicates the start of a note at 302. In response to receiving the input to start playing the note, the virtual instrument can be instructed to begin playing the isolated note 306 and the resonance note 308 at roughly the same time. Here, the two different sounds (isolated and resonance) that correspond to the note selected by the user can be layered together to sound like the actual note is being played. The layering can involve playing them both at the same time (or at least overlapping the playback for some time) so that the user hears them together and is unaware that two different samples are being played at the same time. To the user, it will sound like the actual note is being played by the instrument, as the two sounds, when layered, make up the whole sound that is produced when that note is actually played by the instrument.

As time continues, after the user started the note 302, the isolated sound will continue to play as appropriate. For example, depending on how hard or for how long the user pushed on the UI, the isolated note sample may be played. In some examples, the resonance sound will continue to play. However, as would happen when the actual instrument is played, the resonance sound would begin to fade (e.g., in volume, emphasis, etc.) over time, as illustrated by the triangular shape that tapers as time goes on. Depending on how hard the user selects the input (e.g., based on an amount of pressure or an amount of time pushed), the virtual instrument may be instructed to set an amount of time and/or alter the loudness for the resonance sound to play. During playback, the isolated and/or resonance notes can be played for any relevant amount of time, as desired, that makes sense for attempting to simulate an actual instrument. However, the resonance note will almost always continue playing for some time (any amount of time determined to be relevant) after the isolated note ends. In some examples, the resonance sound will be configured to play at an appropriate loudness relative to the triggering isolated note. For example, a quite isolated note can be played with the same resonance note as that for a loud isolated note. However, the volume of the resonance note will be reduced for the quite note (e.g., to the same volume as that of the isolated note).

As described in FIG. 3, there are many possible recordings of the isolated sound that can be chosen for playback when the user selects the note 302. For example, for different loudness, plucking techniques, string types, etc., there is a different isolated recording. Additionally, the note can be pitch bent or have vibrato added. As such, the virtual instrument can either manipulate the sample to create the pitchbending or the vibrato, or separate sounds could have been sampled to enable this. In contrast, for the resonance note that is played, there is a single recording for all isolated cases of the note being played. Additionally, the resonance note would not respond to pitchbend or vibrato inputs from the user. Instead, the same resonance note would be played in every instance of the note selected by the user.

Further, in some examples, when the note ends 304, the first layer (e.g., the isolated note) will end. However, the resonance note will continue at least until the predetermined time expires. For example, even though the isolated note has stopped playing, the resonance note will continue to fade out according to the schedule already set up for that note. Thus, an additional level of realism is introduced, where the sound played by the virtual instrument may sound more real than other virtual instruments. Further, it is worth noting that the note may end 304 based on a predetermined amount of time for the isolated note to play expiring or by the user deselecting the UI element that corresponds to playing the note.

In other words, the note may end 304 by default or by intentional selection of the user.

Figure 4:
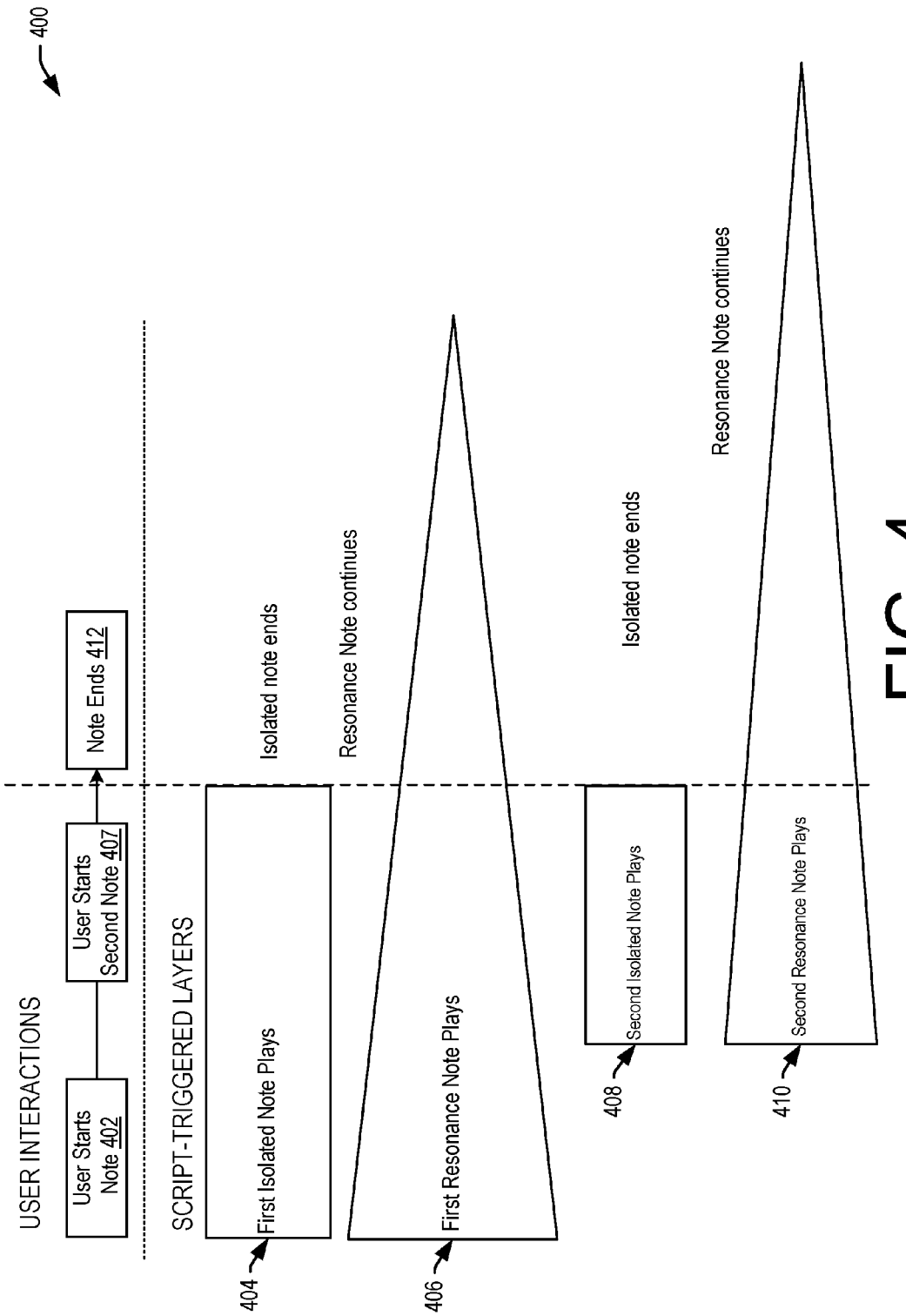
FIG. 4 is another simplified block diagram illustrating at least some additional examples techniques for implementing separate isolated and resonance samples for a virtual instrument as described herein, according to at least one example.

The illustration of FIG. 3 provides one example of how the layering rules can be implemented. In this example, the manner of input could be a string strum of a note (e.g., the user may have dragged their finger across the virtual string, thus indicating they wish to generate a strum sound for that note). If that is the only input received from the user, the rule to be applied may be associated with the following condition: play single note B, strum variation, no other samples currently playing. Of course, this is just one of many conditions that could occur, and each condition may have a different rule. However, in some cases, the rule may be note agnostic. For example, the rule may not specify which note to play, just how to play it. In other words, the note can always be defined strictly by the location of the UI that is selected (e.g., the string that is virtually touched can indicate the note); however, the manner in which it is touched (e.g., pick, strum, etc.) along with other factors (e.g., are other notes touched, are other samples currently being played, how long was the note touched, etc.) may define the rule that is to be applied for the playback and/or layering of samples. In the example of FIG. 3, when the user selects a UI element of the virtual instrument, the system determines the note being played and the manner in which the input was received. For the sake of illustration, if the note is an F, and the manner is a pluck, FIG. 4 shows another example flow diagram 400 for illustrating at least one other rule that can be followed for playing the different samples based on a user input at the UI of the virtual instrument described herein. As noted, in some examples, the manner in which a user provides an input to the UI may be used to determine which playback rule applies. Thus, FIG. 4 illustrates at least an additional example of these rules. The top half of the flow illustrates user interactions while the lower half of the flow illustrates the script-triggered layers.

As time moves from left to right in FIG. 4, in some cases, a user may provide an input to the UI that indicates the start of a note at 402. In response to receiving the input to start playing the note, the virtual instrument can be instructed to begin playing the isolated note 404 and the resonance note 406 at approximately the same time. Again, the two different sounds (isolated and resonance) that correspond to the note selected by the user can be layered together to sound like the actual note is being played. The layering can involve playing them both at the same time so that the user hears them together and is unaware that two different samples are being played at all. To the user, it will sound the actual note (e.g., one sound) is being played by the instrument, as the two sounds, when layered, make up the whole sound that is produced when that note is actually played by the instrument.

As time continues, after the user started the note 402, the isolated sound will continue to play as appropriate. For example, depending on how hard or for how long the user pushed on the UI, the isolated note sample may be played. In some examples, the resonance sound will continue to play. However, as would happen when the actual instrument is played, the resonance sound would begin to fade (e.g., in volume, emphasis, etc.) over time, as illustrated by the triangular shape that tapers as time goes on. Depending on how hard the user selects the input (e.g., based on an amount of pressure or an amount of time pushed), the virtual instrument may be instructed to set an amount of time for the resonance sound to play.

In some examples, before the first isolated note and the first resonance note end, a user may make a selection via the virtual instrument UI to play a second note 407. The second note may be the same as the first note, or it may be different. In some cases, either scenario would invoke a different rule. In the first example, where the second note is the same as the first note, the second isolated note will be played 408 and the second resonance note will be played 410 (e.g., at approximately the same time). In this case, the second isolated note will be the same as the first isolated note, and it will play under the same conditions as described above (e.g., based at least in part on the manner of input, etc.). Additionally, the second resonance note will be the same sample used to play the first resonance note. At this point, all four samples are being played at the same time. However, what the user hears is that the first and second notes were played sequentially (e.g., corresponding to the user's input) and that the resonance note (e.g., ambient sound associated with playing that note) has continued naturally. When the note ends 412, the virtual instrument may stop playing the first isolated note and the second isolated note; however, the first resonance note and the second resonance note may continue to play until each ends. While the first resonance note may end before the second resonance note ends, the user may not notice, because in this case, they were the same sample. To the user, it will sound like the a single resonance sound played out as it would naturally with the actual instrument.

The above example, where the second note being played is the same as the first note that is already being played, illustrates another one of the potential rules that can be invoked based on the user's input. Another potential for using a different rule would include an instance where the second note selected by the user 407 is the same note, but the manner of input is different. In this case, the first isolated note would be played 404 based on the first input manner (e.g., strum) and the second isolated note would be played 408 based on the second input manner (e.g., pluck). Still, the first and second resonance notes played 406, 410 will be the same because the note was at the same, and, as described above, a single resonance note is recorded for each note. In yet another example, the second note selected by the user 407 could be a different note from the first note selected by the user 402. In this case, the flow would be similar to the first examples, except that the second isolated note played 408 would be a different note than the first isolated note played 404. Additionally, the second resonance note played 410 would be a different sample as the first resonance note played 404. In this way, the user may hear the two different notes overlapping, with the first resonance note ending prior to the second resonance note; however, this will sound more natural than a two different single sample that each encompass both layers (e.g., isolated and resonance) being played sequentially. In particular, it is the ability to layer the isolated and resonance samples (since there are separate samples for each note) that makes splitting of the original sound recordings an improvement over current system.

Similar to the features described in FIG. 3, there are many possible recordings of the isolated sound that can be chosen for playback when the user selects the note 402. For example, for different loudness, plucking techniques, string types, etc., there is a different isolated recording. Additionally, the note can be pitch bent or have vibrato added. As such, the virtual instrument can either manipulate the sample to create the pitchbending or the vibrato, or separate sounds could have been sampled to enable this. In contrast, for the resonance note that is played, there is a single recording for all isolated cases of the note being played. Additionally, the resonance note would not respond to pitchbend or vibrato inputs from the user. Instead, the same resonance note would be played in every instance of the note selected by the user.

As described above, various different rules can be associated with various different conditions. Conditions can include the manner of input, the note being selected, as well as whether or not other notes are currently being played, are ending, etc. While not every set of conditions or every rule are described herein, one of ordinary skill would understand that different conditions will be handled by different rules, and that any combination of rules is possible.

Figure 5:
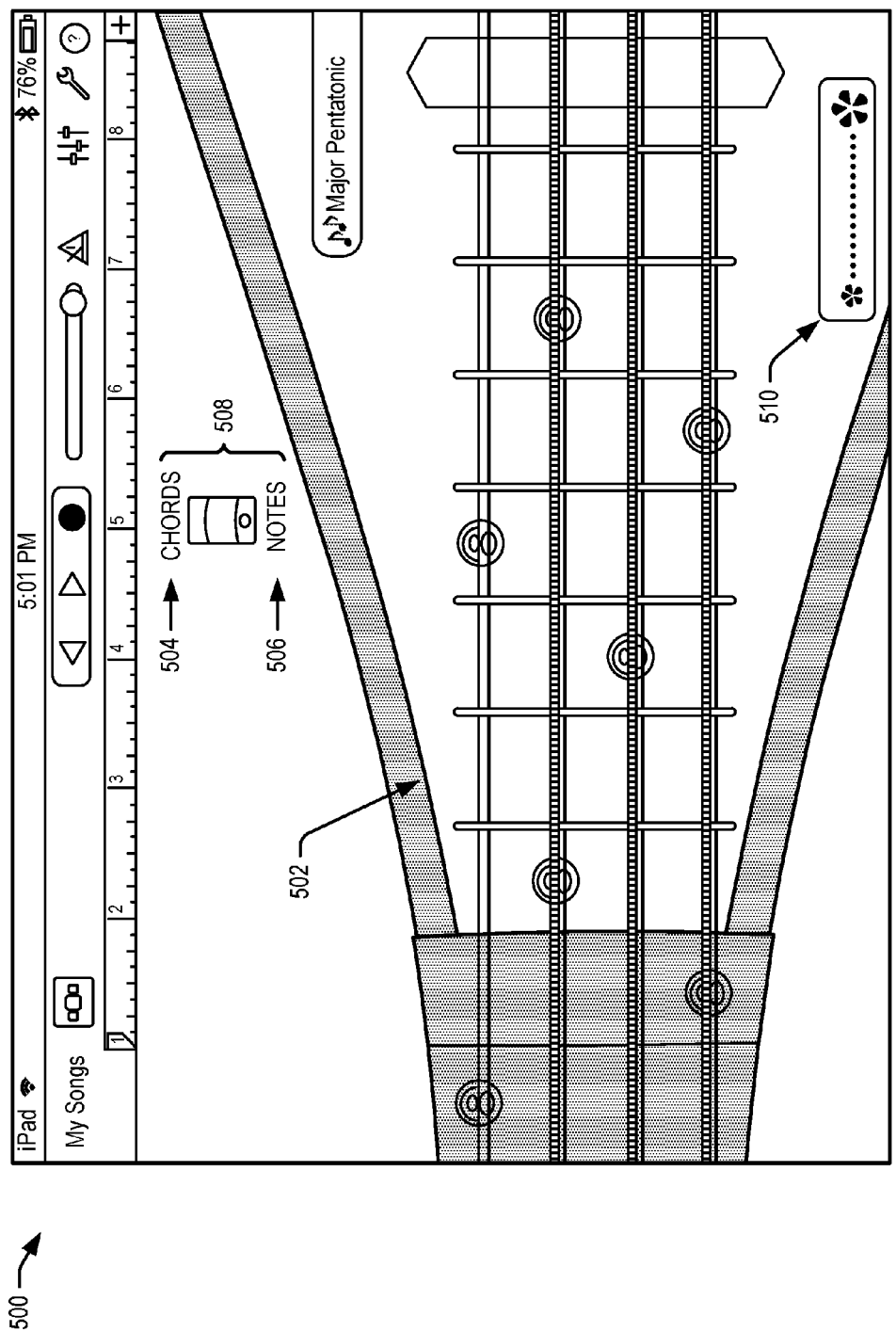
FIG. 5 is a simplified block diagram illustrating an example user interface for enabling a user to interact with a virtual string instrument as described herein, according to at least one example.

FIG. 5 illustrates an example UI 500 for a virtual instrument, called a pipa. Pipa 502 is a traditional Chinese lute, or multi-stringed instrument that is similar to a guitar. It has four strings tuned low-to-high A-D-E-A, and is played with finger picks. The plucking is 'pi' outward and 'pa' inward. When 'fretted' the strings do not touch the neck or body of the instrument, therefore a characteristic deep vibrato is possible by pressing down on the strings between the frets. String bends are also a common technique for the hand that holds the neck. For the picking hand, a tremolo technique called lunzhi is very common and an important characteristic playing style for the pipa. The lunzhi is a rapid succession of the plucking fingers while one note is fretted. There is also a characteristic rapid raking/strumming of all four strings in both directions called the sao and fu. In some examples, the UI 500 will have two main views (e.g., "Notes" 504 and "Chords" 506).

Notes view will allow the user to play on a version of the neck that is laid out chromatically with intervallic relationships that match the real instrument. Notes view will also feature an affordance, which allows the user to switch to a fixed scale. 'Pushing' strings up or down will bend the note. Note Volume will be based at least in part on an attack accelerometer value mapped to a MIDI velocity. Chords view will feature eight chord strips (12 on iPad Pro) divided into 6 sections. These chord strips may follow a standard chord layout with custom chord options. The individual zones within a chord strip will play single notes, and the six zones within a chord strip will outline the chord using traditional sounding Chinese scales (typically Major Pentatonic). Four auto play grooves will also be presented to the user in chords view. Turning on any of these auto play grooves will allow the user to tap on individual chord strips to play an associated groove.

In some examples (e.g., on a mobile device), there will be a transitional element (Controls view) 508 which will allow the user to switch between Notes view and Chord view. Controls view is also where the auto play selector can be presented.

A lunzhi/tremolo ornamentation momentary switch 510 (e.g., a UI element or the like) will be shown in the Notes view and harmony/chords view. Pressing it while also pressing a note on the neck or in the chord strip will play the note with the lunzhi/tremolo technique. In some embodiments, the speed of the Lunzhi will be modulated using 3D pressure on the button for devices that are 3D pressure enabled. For instance, for a device in which pressure can be detected by a touch screen. Alternatively, the speed of the lunzhi is modulated by movement away from the center of the button. In another embodiment, it is modulated by movement away from one end of a slider to another end. In some examples, playing the lunzhi technique by the virtual instrument comprises playing a single isolated note, corresponding to the selected note on the neck, repeatedly iterated over and over at different speeds (e.g., according to the selected pressure). Playing the lunzhi technique also comprises playing a single resonance sample corresponding to the selected note. In some instances, a new resonance note may be played for each new note triggered, but not for all noodlings.

A strum strip will allow the user to swipe up/down to create the raked sao and fu strums. The strum strip may be on the right side of the UI. The strip will allow direct interaction with the strings by swiping across or tapping on the strings, as well as a button strum feature that will rake all 4 strings automatically.

The instrument will also respond to 3D touch by possibly adding vibrato on direct note touches, and also modifying expression for lunzhi/tremolo notes. In some cases, device tilt might be used as an additional gesture to achieve the characteristic bends into notes. A switch to disable tilt effects for all may be configurable in settings.

Figure 6:
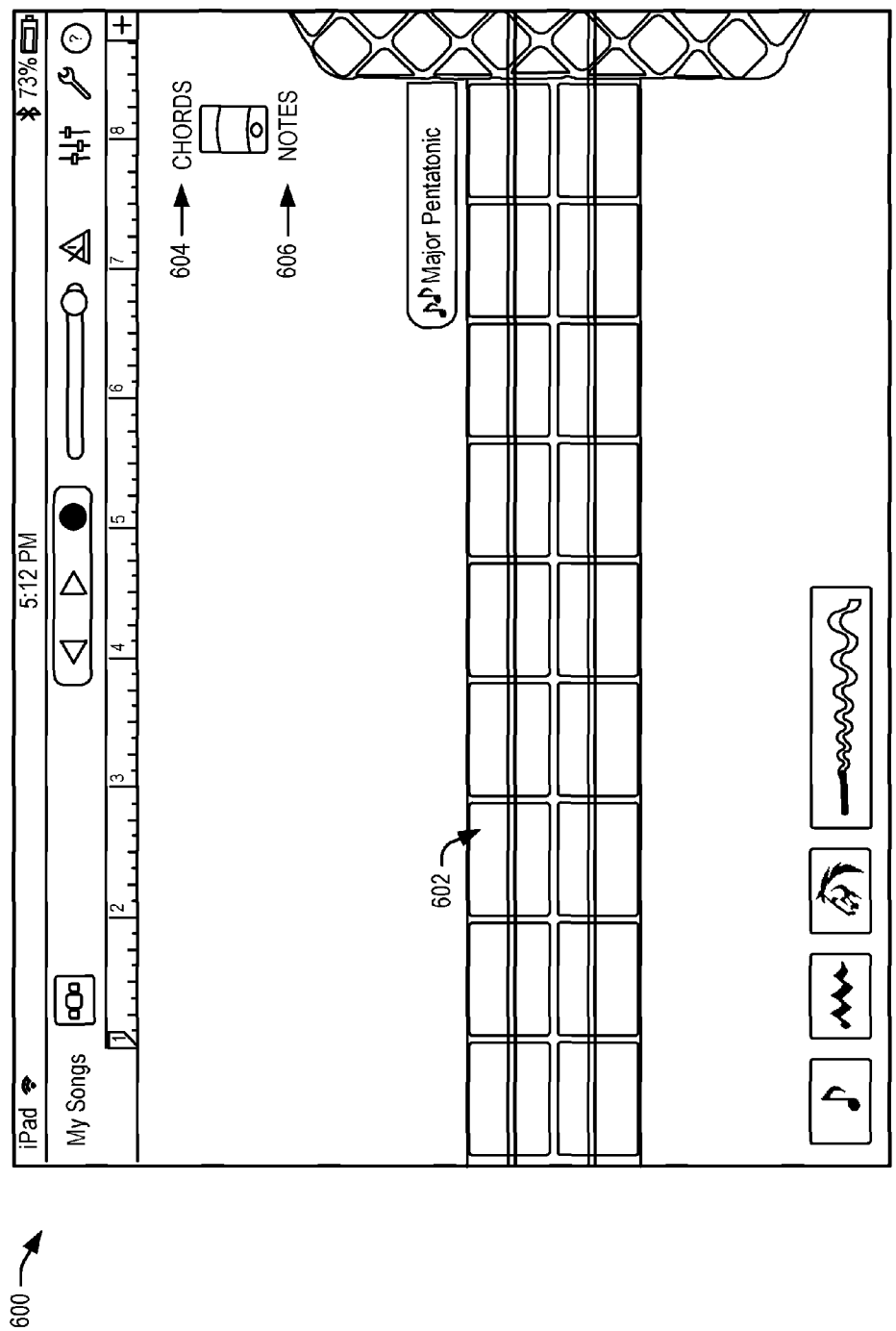
FIG. 6 is another simplified block diagram illustrating another example user interface for enabling a user to interact with another virtual string instrument as described herein, according to at least one example.

FIG. 6 illustrates another example UI 600 for a different virtual instrument, called an erhu. Erhu 602 is another traditional Chinese stringed instrument. It has two strings and is generally played with a bow. It is known for very expressive playing styles and is often considered a sorrowful instrument. Typical traditional playing styles feature many deep vibrato, glissandi, pull-offs, hammer-ons, wide dynamic range, and characteristic ornaments like trill, grace notes, and mordents. The instrument is also known for a characteristic "Horse effect" which is played using upper glissando harmonics and deep vibrato. In some examples, the UI 600 will have two main views (e.g., "Notes" 604 and "Chords" 606). Notes view will allow the user to play on a version of the neck that is laid out chromatically with intervallic relationships that match the real instrument. Notes view will also feature an affordance, which allows the user to switch to a fixed scale. Sliding up or down strings will glissando in both chromatic and scale view. Volume will be modulated (via expression controller) by vertical position of touch within a touch zone. Chords view will feature at least eight chord strips divided into at least six sections. These chord strips will follow a standard chord layout but will have custom chord options. The individual zones within a chord strip will only play single notes, but the six zones within a chord strip will outline the chord using traditional sounding Chinese scales. Four auto play grooves will also be presented to the user in chords view. Turning on any of these auto play grooves will allow the user to tap on individual chord strips to play an associated groove.

Figure 7:
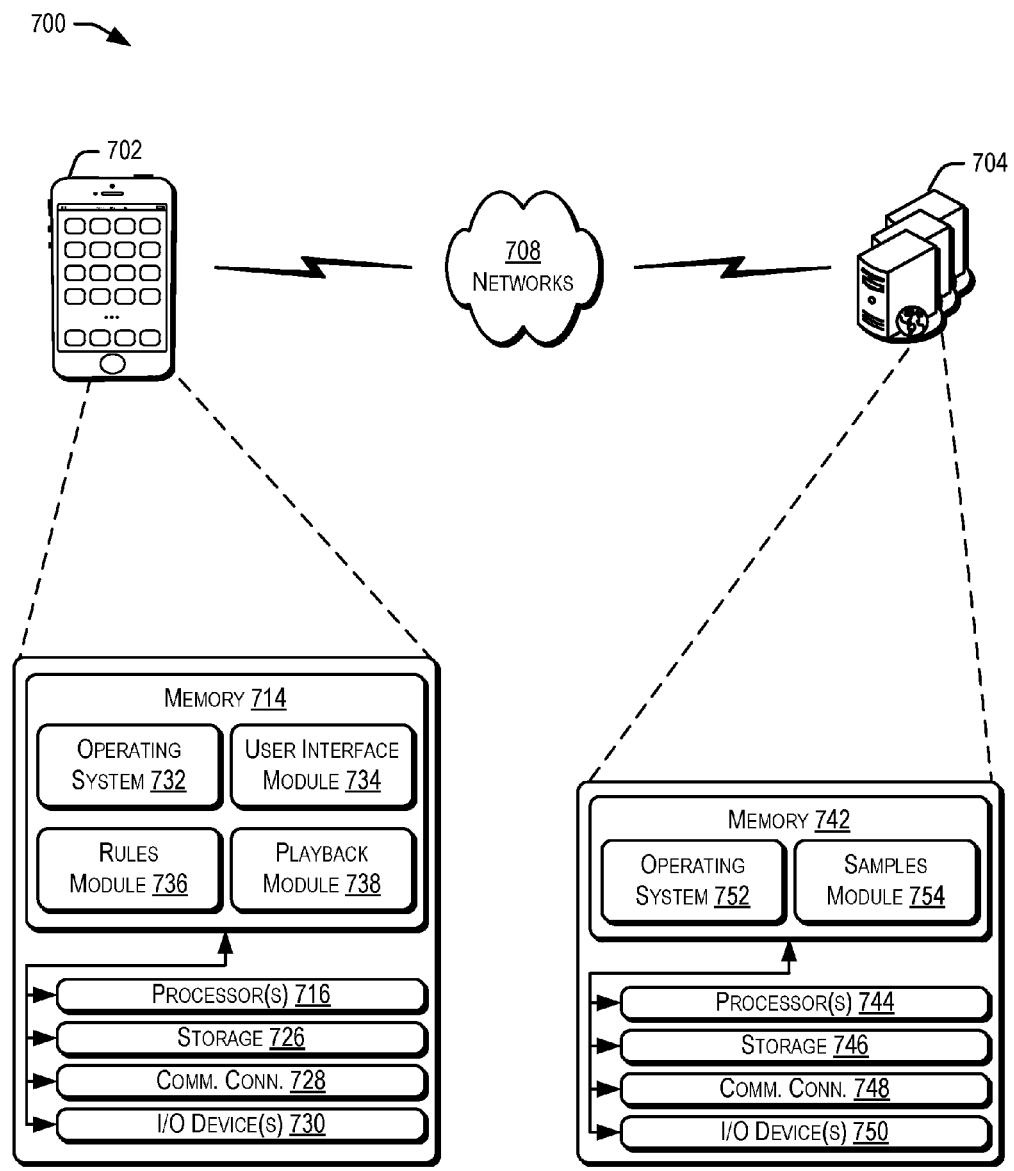
FIG. 7 is a simplified block diagram illustrating an example architecture for implementing separate isolated and resonance samples for a virtual instrument as described herein, according to at least one example.

FIG. 7 illustrates an example architecture or environment 700 configured to implement separate isolated and resonance samples for a virtual instrument as described herein. In some examples, a computing device 702 of the example architecture 700 may be configured to potentially interact with one or more service providers and/or service provider computers 704. In some examples, the devices may be connected via one or more networks 708 (e.g., via Bluetooth, WiFi, the Internet, or the like). In the architecture 700, one or more users may utilize the computing device 702 to present content items in a user interface.

In some examples, the networks 708 may include any one or a combination of many different types of networks, such as cable networks, the Internet, wireless networks, cellular networks, satellite networks, other private and/or public networks, or any combination thereof While the illustrated example represents the computing device 702 accessing the service provider computers 704 via the networks 708, the described techniques may equally apply in instances where the computing device 702 interacts with the service provider computers 704 over a landline, or in any other manner. It is also noted that the described techniques may apply in other client/server arrangements (e.g., set-top boxes, etc.), as well as in non-client/server arrangements (e.g., locally stored applications, peer-to-peer configurations, etc.).

As noted above, the computing device 702 may be configured to execute or otherwise manage applications or instructions for presenting UIs such as, but not limited to, a UI for playing one or more virtual instruments. The computing device 702 may collect receive inputs from a user at the UI, determine which audio samples to play in order to simulate playing the instrument, and then play the audio samples according to a set of rules and/or conditions. The computing device 702 may also receive the samples from a recording device and/or from the service provider computers 704, other computing devices, or the like via the networks 708.

The computing device 702 and/or the service provider computers 704 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like. As noted, the service provider computers 704 may be in communication with the computing device 702 via the networks 708, or via other network connections.

In one illustrative configuration, the computing device 702 may include at least one memory 714 and one or more processing units (or processor(s)) 716. The processor(s) 716 may be implemented as appropriate in hardware, computer-executable instructions, or combinations thereof. Computer-executable instruction or firmware implementations of the processor(s) 716 may include computer-executable or machine-executable instructions written in any suitable programming language to perform the various functions described. The computing device 702 may also include geo-location devices (e.g., a global positioning system (GPS) device or the like) for detecting, providing, and/or recording geographic location information associated with the computing device 702, the content items, and/or the user.

The memory 714 may store program instructions that are loadable and executable on the processor(s) 716, as well as data generated during the execution of these programs. Depending on the configuration and type of the computing device 702, the memory 714 may be volatile (such as random access memory (RAM)) and/or non-volatile (such as read-only memory (ROM), flash memory, etc.). The computing device 702 may also include additional removable storage and/or non-removable storage 726 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 714 and the additional storage 726, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 714 and the additional storage 726 are both examples of non-transitory computer storage media. Additional types of computer storage media that may be present in the computing device 702 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 702. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 702 may also contain communications connection(s) 728 that allow the computing device 702 to communicate with a data store, another computing device (e.g., the service provider computers 704) or server, user terminals and/or other devices via the networks 708. The computing device 702 may also include I/O device(s) 730, such as a touch input device, a keyboard, a mouse, a pen, a voice input device, a display, speakers, a printer, etc. For example, utilizing a speaker and microphone, the computing device 702 may be configured to answer an incoming telephone call.

Turning to the contents of the memory 714 in more detail, the memory 714 may include an operating system 732 and/or one or more application programs or services for implementing the features disclosed herein including a user interface module 734, a rules module 736, and/or a playback module 738. The memory 714 may also be configured to store the isolated and resonance samples. In this way, the computing device 702 can perform all of the operations described herein, including implementing the entire virtual instrument application, without connection to any other computing devices or networks. For example, the virtual instrument application can be executed locally with locally stored samples. In some examples, the user interface module 734 may be configured to manage the user interface of the computing device 702. For example, the user interface module 738 may present the virtual instrument and its relevant options. Further, the user interface module 738 may be configured to present one or more options for simulating or otherwise playing the virtual instruments. Additionally, in some examples, the user interface module 738 may be configured to receive and/or interpret user input, UI element selections, and/or gesture information (e.g., via touch screen) for interacting with the virtual instruments. For example, a user may tap a virtual string of a virtual instrument to cause the computing device 702 to play a note.

The rules module 736, in some cases, may be configured to store a set of rules and/or associated conditions, as well as associated manners of input. For example, the rules module 736 may be configured to determine which playback rule applies in which situation, such that the computing device 702 is able to accurately simulate the playback of notes based at least in part on the user inputs. The user can make an input selection, for example, to play a note or a chord, and the rules module 736 can determine which playback rule applies and which samples to layer and/or play. In some cases, the playback module 738 may be configured to send samples to speakers or other output devices for playback based at least in part on the rules determined by the rules module 736.

While many of the examples herein are described with reference to the computing device 702 being a mobile phone, it should be understood that any type of computing device may be used to perform the functions/embodiments described, as appropriate. For example, the computing device 702 may be a smart watch, a wireless headset or earpiece, or other computing device with a touch screen or input device. In some instances, the computing device 702 may also be equipped a microphone and speaker(s). As such, the computing device 702 (as described above) may be configured for answering incoming phone calls on behalf of a user device (e.g., a mobile phone) and/or the speaker(s) can be used to play the samples.

The service provider computers 704 may also be any type of computing device. In one illustrative configuration, the service provider computers 704 may include at least one memory 742 and one or more processing units (or processor(s)) 744. The processor(s) 744 may be implemented as appropriate in hardware, computer-executable instructions, or combinations thereof. Computer-executable instruction or firmware implementations of the processor(s) 744 may include computer-executable or machine-executable instructions written in any suitable programming language to perform the various functions described.

The memory 742 may store program instructions that are loadable and executable on the processor(s) 744, as well as data generated during the execution of these programs. Depending on the configuration and type of the service provider computers 704, the memory 742 may be volatile (such as RAM) and/or non-volatile (such as ROM, flash memory, etc.). The service provider computers 704 may also include additional removable storage and/or non-removable storage 746 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 742 may include multiple different types of memory, such as SRAM, DRAM, or ROM. While the volatile memory described herein may be referred to as RAM, any volatile memory that would not maintain data stored therein once unplugged from a host and/or power would be appropriate. The memory 742 and the additional storage 746, both removable and non-removable, are both additional examples of non-transitory computer-readable storage media.

The service provider computers 704 may also contain communications connection(s) 748 that allow the service provider computers 704 to communicate with a data store, another computing device or server, user terminals and/or other devices via the networks 708. The service provider computers 704 may also include I/O device(s) 750, such as a keyboard, a mouse, a pen, a voice input device, a touch input device, a display, speakers, a printer, etc.

Turning to the contents of the memory 742 in more detail, the memory 742 may include an operating system 752 and/or one or more application programs or services for implementing the features disclosed herein including a samples module 754. In some examples, the samples module 754 may be configured to record and/or store the isolated and/or the resonance samples. When the service provider computers 704 are configured as a recording device, the samples module 754 may be configured to manage the microphone for recording the separate isolated and resonance samples. The samples module 754 may also be configured to store the samples once recorded. In some cases, the samples may be stored in the samples module 754 and provided upon request (e.g., on demand) to the computing device 702 in real-time. In some instances, the samples module 754 may, instead, be stored in the memory 714 of computing device 702. As such, the computing device 702 can store the isolated samples and the resonance samples locally, and implement the virtual instrument application without being connected to the service provider computers 704.

While many embodiments are described herein with reference to stringed instruments such as guitars, pipas, and erhus, the features described herein can be used to implement any virtual instrument imaginable. For example, the concepts of described herein, including the use of separate isolated and resonance audio samples for a single note, can be utilized with any virtual instrument.

Figure 8:
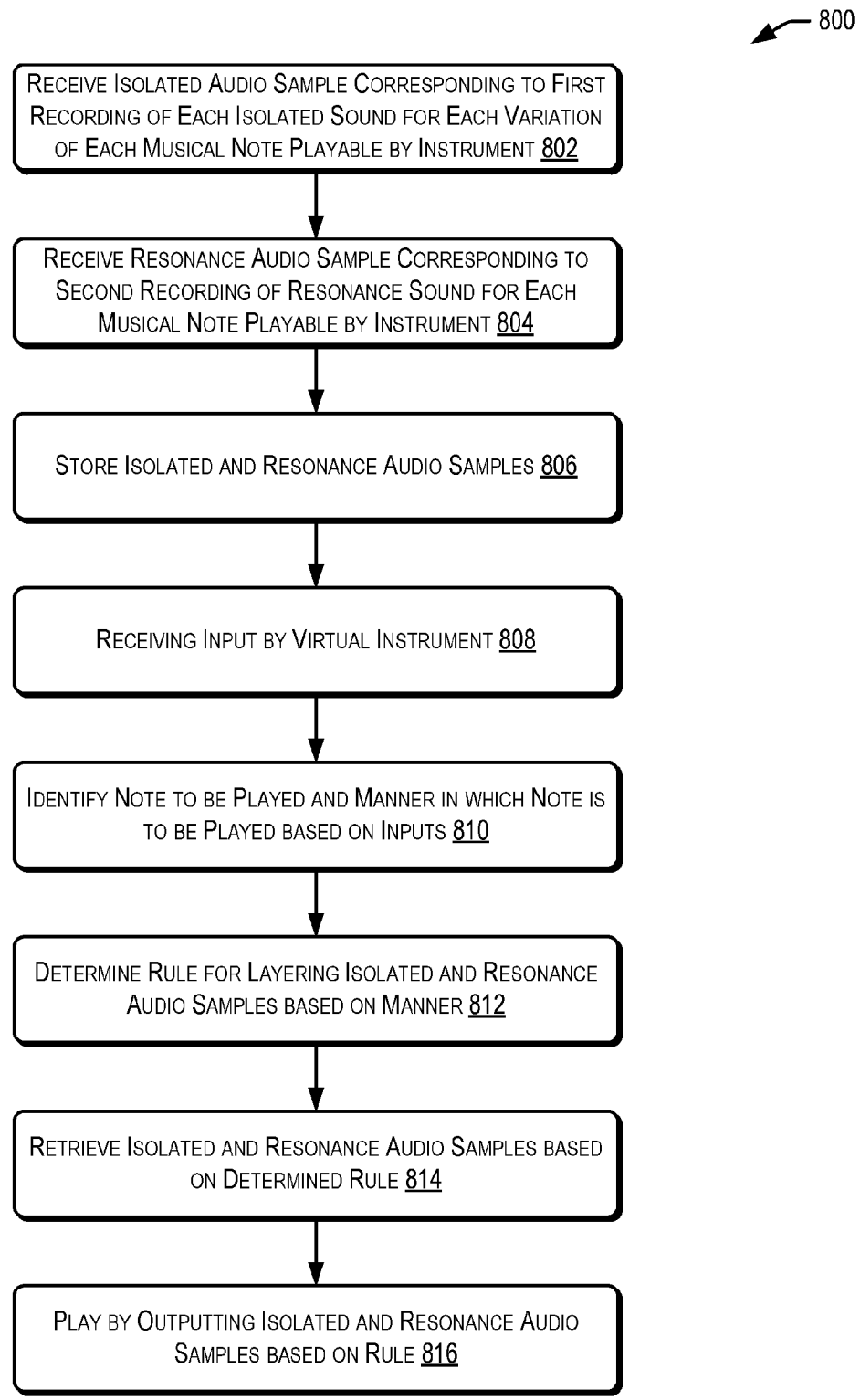
FIG. 8 is a simplified flow diagram illustrating an example process for implementing separate isolated and resonance samples for a virtual instrument as described herein, according to at least one example.
Figure 9:
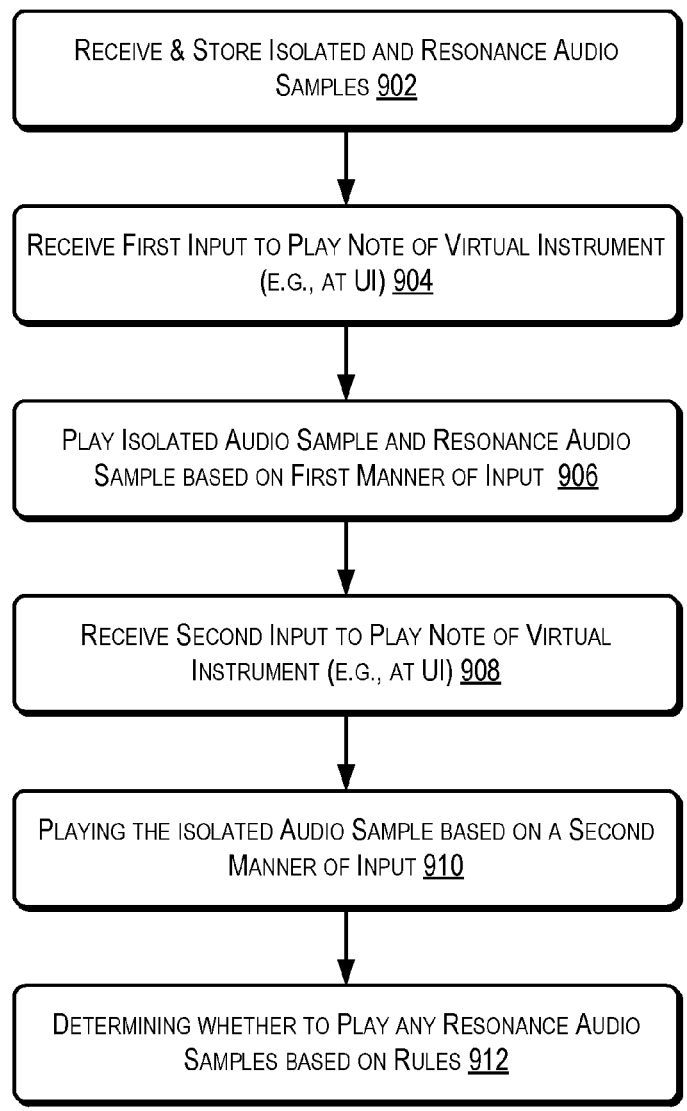
FIG. 9 is another simplified flow diagram illustrating another example process for implementing separate isolated and resonance samples for a virtual instrument as described herein, according to at least one example.

FIGS. 8 and 9 illustrate example flow diagrams showing respective processes 800 and 900 for implementing isolated and resonance audio samples for a virtual instrument, as described herein. These processes 800 and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, the process 800 may be performed by the computing device 702 of FIG. 7 (e.g., utilizing at least the user interface module 734 and/or the rules module 736 shown in FIG. 7. The process 800 may begin at 802 where an isolated audio sample corresponding to a first recording of each isolated sound for each variation of each musical note playable by an instrument is received. In some examples, the variation can include the manner in which the note is to be played, how loud the note is to be played, whether there is a vibrato or other technique to be used, etc. As such, a recording device may be configured to record samples for each of these variations for every possible musical note (or almost every note, or at least some subset of all the notes) that can be played by the instrument. One distinction between the recordings of the isolated sounds and those of the resonance sounds, is that the resonance sounds are recorded (sampled) a single time for each note, regardless of the variation or technique of play. In one illustrative example, separate isolated samples are recorded for the following variations of a single note: a pick of note E, a strum of note E, a hammer of note E, a fingernail draw of note E, a bow draw of note E, a sustain of note E, and/or other playing techniques of the note E. That is, for each of those and other techniques for playing the note E, there are individual isolated samples recorded and stored. On the other hand, a single resonance sample will be recorded for the note E, and that resonance sample can be layered with the appropriate isolated sample during playback.

At 804, a resonance audio sample corresponding to a second recording of a resonance sound for each musical note playable by the instrument may be received. Here, the computing device 702 may receive the resonance audio samples for each note. In some examples, all of the isolated and resonance samples (notes, chords, etc.) can be stored for later use/playback at 806. In some cases, at 808, a user input can be received at the UI of the virtual instrument and/or by the virtual instrument (e.g., an application with a UI). The received input may indicate a note to be played and/or a manner in which the note should be played. As noted, the manner in which the note is to be played can be indicated by the user by the use of gestures, stroke techniques, tap techniques, pressure, etc., on the screen of the computing device 702. At 810, the note to be played and the manner in which the note is to be played are identified and/or determined based at least in part on the user input. This can be performed by the user interface module 734. In some cases, at 812, a rule for layering the isolated audio samples and the resonance audio samples may be determined based at least in part on the determined rule. In some cases, this can be performed by the rules module 736. For example, the layering may include playing both isolated and resonance samples at the same time, but letting the resonance sample continue to fade out after the isolated sample has completed playback. At 814, the isolated and resonance samples may be retrieved from memory based at least in part on the determined rule. Further, the process 800 may end at 816 where the isolated sample and the resonance sample are played according to the determined rule. As described above, the rule may also be affected by one or more conditions that are not directly related to the manner in which the note is to be played. For example, conditions may include whether another note is currently being played, whether a chord was selected, whether other notes are concurrently selected, etc.

FIG. 9 illustrates another process 900 for implementing separate isolated and resonance samples for a virtual instrument, according to at least a few embodiments. In some examples, the process 900 may be performed by the computing device 702 of FIG. 7 (e.g., utilizing at least the user interface module 734 and/or the rules module 736 shown in FIG. 7. The process 900 may begin at 902 where the process 900 may receive isolate and resonance audio samples from a recording device or service provider (e.g., server that has stored the previously recorded isolated and resonance notes).

At 904, a first input (e.g., a request) to play a note of a virtual instrument may be received. The input may be received at a UI by the user, and may be handled by the user interface module 734. The first input may include information about the note to be played and/or the manner in which the note should be played. The note to be played may be referenced by one of musical scale of notes, and the manner in which the note should be played may be referenced by a playing technique, or the like. As described, playing techniques may include any type of instrument playing technique including, but not limited to, strum, strike, hammer, attack, fingernail draw, bow draw, trill, lunzhi, horse effect, etc. At 906, a corresponding isolated sample and a resonance sample can be played, using speakers or the like, by the virtual instrument based at least in part on the selected note and the manner in which the note is to be played. At 908, a second input (e.g., request) to play the same note may be received (e.g., at the UI and handled by the user interface module 714). Because the same note was selected, the manner in which the note is to be played will determine whether the same isolated sample will be played, or a different isolated sample for the same note. For example, if the first user input indicates that an F# was selected, where the manner is strum, the first isolated sample to be played would be the isolated sample corresponding to the F# strum, and the first resonance sample to be played would be the resonance sample for F#.

Continuing with the current example, if the second user input indicates that an F# was selected, where the manner is strum, then the same isolated sample would be played (i.e., isolated sample corresponding to F# strum) layered with the first resonance sample depending on the rules determination. However, if the second user input indicates that an F# was selected, but the manner was pick, then a different isolated note would be played (i.e., the isolated sample corresponding to F# pick sample) layered with the first resonance sound depending on the rules determination. Thus, when the note is the same, the second isolated sample to be played at 910 will be based on the manner in which the note is to be played. Further, the process 900 may end at 912, where it will be determined whether to play any resonance samples at all based on the rules. For example, some rules will instruct the virtual instrument application to not play another resonance sample at all (e.g., when a slide request or a noodling request are received after the first note is selected). However, other rules may instruct the virtual instrument to play the same resonance sample since the same note was played twice. In either case, the rule corresponding to the second manner of input (e.g., whether the rule is met) will determine whether a second resonance sample is to be played.

Figure 10:
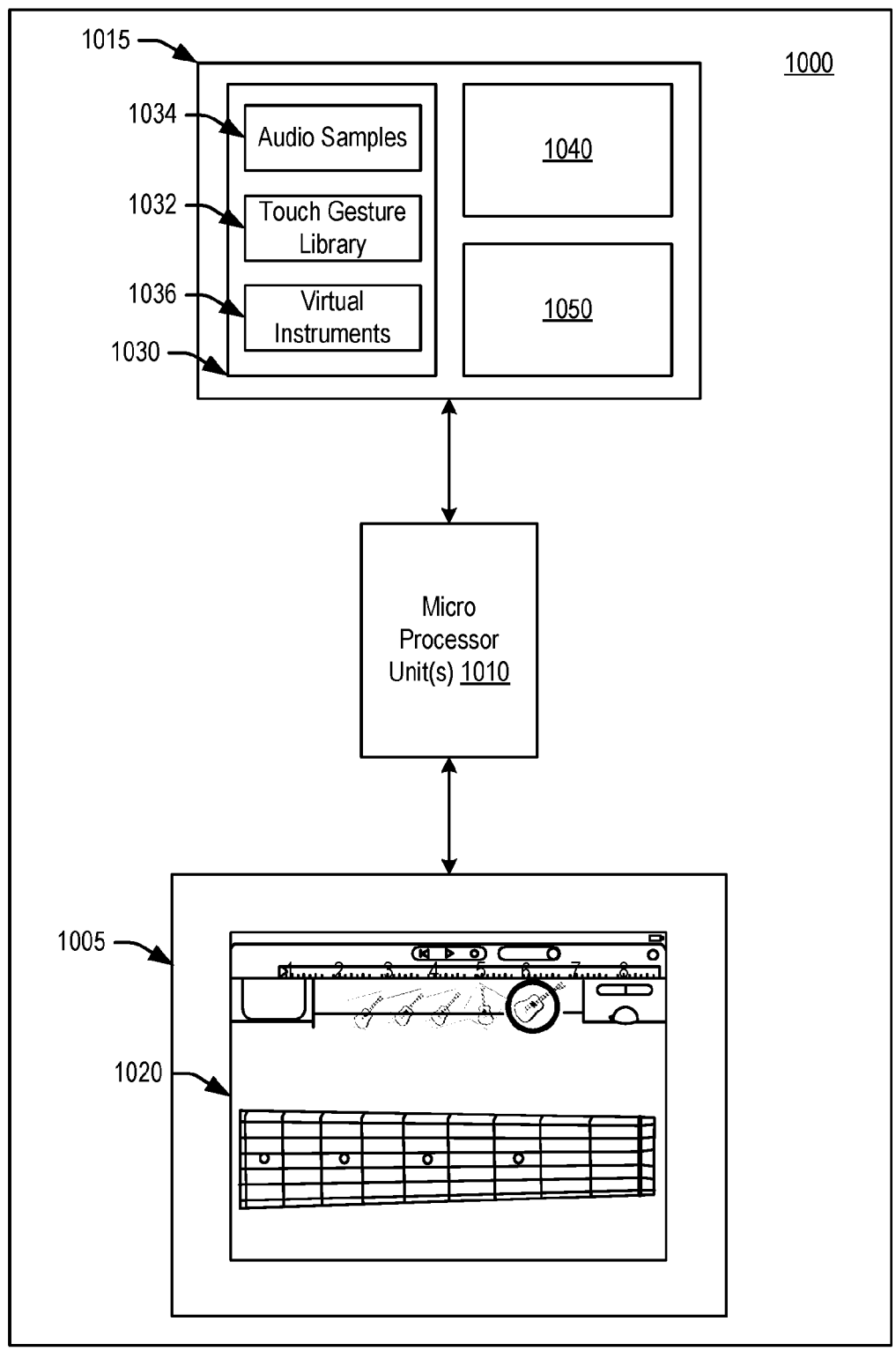
FIG. 10 is a simplified block diagram illustrating an example of a musical performance system that can enable a user to compose and create music with a number of virtual instruments on a music application as described herein, according to at least one example.

FIG. 10 illustrates an example of a musical performance system that can enable a user to compose and create music with a number of virtual instruments on a music application, according to an embodiment of the invention. Musical performance system 1000 can include multiple subsystems such as a display 1005, one or more processing units 1010, and a storage subsystem 1015. One or more communication paths can be provided to enable one or more of the subsystems to communicate with and exchange data with one another. The various subsystems in FIG. 10 can be implemented in software, in hardware, or combinations thereof. In some embodiments, the software can be stored on a transitory or non-transitory computer readable storage medium and can be executed by one or more processing units.

It should be appreciated that musical performance system 1000 as shown in FIG. 10 can include more or fewer components than those shown in FIG. 10, can combine two or more components, or can have a different configuration or arrangement of components. In some embodiments, musical performance system 1000 can be a part of a portable computing device, such as a tablet computer, a mobile telephone, a smart phone, a desktop computer, a laptop computer, a kiosk, etc.

Display 1005 in some embodiments can provide an interface that allows a user to interact with musical performance system 1000. Display 1005 can be a monitor or a screen in some embodiments. Through the interface, the user can view and interact with a GUI 1020 of a musical performance system 1000. In some embodiments, display 1005 can include a touch-sensitive interface (also sometimes referred to as a touch screen) that can both display information to the user and receive inputs from the user. Processing unit(s) 1010 can include one or more processors that each have one or more cores. In some embodiments, processing unit(s) 1010 can execute instructions stored in storage subsystem 1015. System 1000 may also include other types of user input and output mechanisms such as allowing a user to provide an input based on received accelerometer or gyroscope sensor readings (internal to system 1000) or provide output such as haptic output based on a desired musical characteristic in addition to audio outputs for playing audio sounds.

Storage subsystem 1015 can include various memory units such as a system memory 1030, a read-only memory (ROM) 1040, and a permanent storage device 1050. The system memory can be a read-and-write memory device or a volatile read-and-write memory, such as dynamic random access memory. The system memory can store some or all of the instructions and data that the processor needs at runtime. The ROM can store static data and instructions that are needed by processing unit(s) 1010 and other modules of system 1000. The permanent storage device can be a read-and-write memory device. Some embodiments of the invention can use a mass-storage device (such as a magnetic or optical disk or flash memory) as a permanent storage device. Other embodiments can use a removable storage device (e.g., a floppy disk, a flash drive) as a permanent storage device.

Storage subsystem 1015 can store a touch gesture library 1015 that includes a number of system recognizable touch gestures 1032 on the GUI 1020, MIDI-controlled audio samples 1034 for storing data relating to music played on the virtual instruments, and virtual instrument data 1036 for storing information about each virtual instrument. Further detail regarding system architecture and auxiliary components thereof are not discussed in detail so as not to obfuscate the focus on the invention and would be understood by those of ordinary skill in the art.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method, comprising:
   receiving an isolated audio sample corresponding to a first recording of each respective isolated sound that corresponds to each variation of each musical note of a plurality of musical notes playable by an instrument;
   receiving a resonance audio sample corresponding to a second recording of a resonance sound that is associated with the instrument for each musical note of the plurality of musical notes;
   storing each respective isolated audio sample and each resonance audio sample;
   receiving an input by a virtual instrument;
   identifying a note to be played that corresponds to at least one of the plurality of musical notes playable by the instrument based at least in part on the received input;
   identifying, based at least in part on the received input, a manner in which the note is to be played that corresponds to a variation of the note based at least in part on the received input;
   determining, based at least in part on the identified manner in which the note is to be played, a rule for layering the isolated audio sample corresponding to the identified note and the resonance audio sample corresponding to the identified manner;
   retrieving the isolated audio sample corresponding to the identified note and the resonance audio sample corresponding to the identified manner based at least in part on the determined rule; and
   playing by outputting the isolated audio sample and the resonance audio sample according to the determined rule.

2. The method of claim 1, wherein the variation comprises a different pitch, a different loudness, a different plucking sound, or a different string sound of each musical note.

3. The method of claim 1, wherein the resonance sound comprises ambient noise produced by the instrument when each musical note is played.

4. The method of claim 1, wherein a first size of memory adequate to store each respective isolated audio sample and each resonance audio sample is smaller than a second size of memory adequate to store a set of recordings that comprise all variations of the plurality of musical notes playable by the instrument.

5. The method of claim 1, wherein the manner in which the note is to be played is identified by an input technique corresponding to at least one of a sustain technique, an attack technique, a release technique, a strum technique, a pick technique, or a bow draw technique.

6. A system, comprising:
a memory configured to store computer-executable instructions;
a speaker; and
a processor in communication with the memory and the speaker, the processor configured to execute the computer-executable instructions to at least:
receive a plurality of isolated audio samples corresponding to recordings of variations of musical notes played by a first instrument and a plurality of resonance audio samples corresponding to recordings of the musical notes played by the first instrument;
store the plurality of isolated audio samples and the plurality of resonance audio samples in the memory;
receive an input at a user interface of a second instrument associated with the first instrument, the input identifying a note to be played by second instrument;
determine a rule for playing at least one of the isolated audio samples and at least one of the resonance audio samples based at least in part on the identified note to be played and a manner in which the note is to be played, the manner corresponding to at least one variation of the variations; and
play, by outputting on the speaker, the at least one isolated audio sample and the at least one resonance audio sample according to the determined rule.

7. The system of claim 6, wherein the plurality of resonance audio samples exclude respective isolated audio samples.

8. The system of claim 6, wherein the second instrument comprises a virtual instrument configured to simulate the first instrument.

9. The system of claim 8, wherein the input that identifies the note to be played by the virtual instrument is received at a user interface of a user device.

10. The system of claim 6, wherein the rule configures the at least one resonance audio sample to be played for a time longer than the at least one isolated audio sample.

11. The system of claim 6, wherein the rule for playing the at least one isolated audio sample and the at least one resonance audio sample is further based at least in part on a set of conditions.

12. The system of claim 11, wherein the set of conditions are configured to evaluate the variation of the note to be played based at least in part on the identified manner.

13. The system of claim 6, wherein the plurality of isolated audio samples are recorded in a monophonic format.

14. The system of claim 6, wherein the plurality of resonance audio samples are recorded in a stereophonic format.

15. The system of claim 6, wherein the processor is further configured to execute the computer-executable instructions to at least:
receive a pitchbend request for the note being played;
bend a pitch of the at least one isolated audio sample based at least in part on the pitchbend request; and
maintain an original pitch of the at least one resonance audio sample being played.

16. A computer-readable storage medium having stored thereon computer-executable instructions that, when executed by a processor, cause the processor to perform operations comprising:
receiving a plurality of isolated audio samples corresponding to recordings of variations of musical notes played by a first instrument and a plurality of resonance audio samples corresponding to recordings of ambient noise recorded when the musical notes are played by the first instrument;
receiving a first input at a user interface of a second instrument, the first input identifying a note to be played by a virtual instrument associated with the first instrument;
playing, by outputting, at least one of the isolate audio samples and at least one of the resonance audio samples based at least in part on a first manner in which the first input is made, the first manner corresponding to a first variation of the variations of musical notes;
receiving a second input at the user interface of the second instrument, the second input identifying the note to be played by the virtual instrument;
playing, by outputting, the at least one of the isolated audio samples based at least in part on a second manner in which the second input is made, the second manner corresponding to a second variation of the variations of musical notes; and
determining whether to play any of the resonance audio samples based at least in part on whether a rule corresponding to the second manner is met.

17. The computer-readable storage medium of claim 16, wherein the plurality of isolated audio samples are recorded at a different time than the plurality of resonance audio samples.

18. The computer-readable storage medium of claim 16, wherein a single resonance audio sample of the plurality of resonance audio samples is recorded for a set of musical notes that comprises each of the variations of musical notes.

19. The computer-readable storage medium of claim 16, wherein the rule instructs the processor to play, by outputting, the at least one of the resonance audio samples if a first pitch of the note corresponding to the first input and a second pitch of the note corresponding to the second input are a same pitch and if a slide request or a noodling request are received at the user interface.

20. The computer-readable storage medium of claim 16, wherein the rule configures the at least one resonance audio sample to be played for a time longer than the at least one isolated audio sample.

* * * * *

UNITED STATES PATENT AND TRADEMARK OFFICE
CERTIFICATE OF CORRECTION

| | | |
|---|---|---|
| PATENT NO. | : 9,805,702 B1 | Page 1 of 1 |
| APPLICATION NO. | : 15/273909 | |
| DATED | : October 31, 2017 | |
| INVENTOR(S) | : Christopher C. Lane, Hage van Dijk and Andrew Barrett | |

It is certified that error appears in the above-identified patent and that said Letters Patent is hereby corrected as shown below:

In the Specification

Column 2, Line 52, delete "the isolate audio samples" and insert --the isolated audio samples--.

In the Claims

Claim 16, Lines 15-16, Column 24, Lines 22-23, delete "the isolate audio samples" and insert --the isolated audio samples--.

Signed and Sealed this
Thirtieth Day of January, 2018

Joseph Matal
*Performing the Functions and Duties of the
Under Secretary of Commerce for Intellectual Property and
Director of the United States Patent and Trademark Office*